United States Patent [19]
Peeters et al.

[11] 3,901,802
[45] Aug. 26, 1975

[54] EXTRACTION OF HEAVY METALS FROM WASTES

[75] Inventors: Karel Peeters, Geel; Norbert Van de Voorde; Paul Dejonghe, both of Mol, all of Belgium

[73] Assignee: Belgonucleaire, Brussels, Belgium

[22] Filed: Mar. 26, 1973

[21] Appl. No.: 345,235

[30] Foreign Application Priority Data
Mar. 29, 1972 Belgium .................................. 14767

[52] U.S. Cl. ..................................... 210/38; 210/41
[51] Int. Cl.² ........................................... C02B 1/44
[58] Field of Search ........................ 210/47, 50–53, 210/24, 28, 38, 41, 32

[56] References Cited
UNITED STATES PATENTS

| | | | |
|---|---|---|---|
| 2,860,952 | 11/1958 | Bergeron et al. ..................... 23/134 |
| 3,408,291 | 10/1968 | Thomas et al. ....................... 210/32 |
| 3,575,854 | 4/1971 | Richards .............................. 210/50 |
| 3,674,428 | 7/1972 | Dean et al. ....................... 210/50 X |
| 3,716,484 | 2/1973 | Lincoln et al. ........................ 210/52 |
| 3,740,331 | 6/1973 | Anderson et al. ..................... 210/53 |

OTHER PUBLICATIONS

Hoover et al., "Disposal of Waste Liquors from Chromium Plating," Industrial & Engineering Chem., Vol. 33, No. 1, Jan., 1941, pp. 131–134.

*Primary Examiner*—Thomas G. Wyse
*Attorney, Agent, or Firm*—Ostrolenk, Faber, Gerb & Soffen

[57] ABSTRACT

A method for extracting heavy metal ions from wastes including contacting the wastes with a mixed salt consisting of iron sulfide and barium sulfate containing a surplus of sulfide ions.

10 Claims, 5 Drawing Figures

EXTRACTION OF HEAVY METALS FROM WASTES

The invention relates to the purification of water and more particularly to a method for extracting small quantities of heavy metal ions such as mercury, copper, lead, zinc, cadmium and other ions from wastes.

It is known that the presence of these metal ions, generally called heavy metals, in wastes constitutes a danger if these wastes are poured into rivers, water-ways, seas or oceans. Indeed, even in very small quantities, some of these metal ions, especially mercury ions, may harm flora, fauna and other living beings.

Mercury is often used as catalyzer in industry. For instance, it is used as cathode for the electrolytical preparation of sodium hydroxide. The wastes resulting from this process generally contain one or more sodium salts and very small quantities mercury, of only a few ppm. But even such micro-quantities are generally too high for shedding these wastes into rivers or public waterways. Analogous problems arise when preparing pesticides and some synthetic matters such as polyethene for instance.

The disposal of other ions such as copper, lead, zinc and cadmium, often occurring in industrial processes, also gives rise to problems. The critical quantities harmful for living organisms vary from ion to ion, but in industrial wastes, this critical limit is very often transgressed.

It has already been proposed to treat these wastes with ion exchangers before shedding them. This method, which is rather expensive, does not finally solve the problem, however as the wastes resulting from the regeneration of these ion exchangers will in turn contain the said metal ions and can neither be discarded.

It has already been proposed to treat these wastes by bringing them into contact with an insoluble metal sulfide so that the heavy metal ions precipitate on the metal sulfide. For economic reason, only the use of iron sulfide can be considered. Further tests however have shown that iron sulfide, although it has good sorption characteristics and can very well be used in thin layers in filter installations under pressure or in batch form, does not give satisfactory results when used in columns. Indeed, iron sulfide is a powdery substance and soon breaks down, even if prepared in granular form, into a fine powder in the presence of water and especially when ions such as calcium, magnesium, sodium etc. are present. This makes percolation difficult, if not impossible, after a certain time.

It is an object of this invention to provide a solution for stabilizing the iron sulfide, i.e., for imparting a good structure to the iron sulfide, so that it can be used in columns.

One aspect of this invention involves a method of stabilizing iron sulfide which comprises preparing the iron sulfide as a mixed salt precipitate comprising iron sulfide and barium sulphate in the presence of a surplus of sulfide ions.

According to another aspect of this invention, a process for extracting heavy metal ions such as mercury, copper, lead, zinc and cadmium from water, comprises the step of contacting the water with a mixed salt comprising iron sulfide and barium sulphate and a surplus of sulfide ions.

The mixed precipitate will preferably have a molar ratio Fe/Ba comprised between 1 and 3. Said ratio will be optimally between 2 and 2.5. As a matter of fact, higher Fe/Ba molar ratios no longer give a complete good structure, while ratios of less than 1 and preferably 2, although they still improve the structure of the mixed salt, lessen the efficiency of the sorption characteristics of iron sulfide.

It has been observed that the reproducibility of the formation of this mixed salt with an excess of sulfide ions does not answer the requirements for industrial use due to oxidation during the drying of the mixed salt, which causes a loss of sulfide ions, and thus entails a decrease of the sorption effect. Moreover, the percolation rate depends on the surplus of sulfide ions.

In order to improve the sulfide concentration in the mixed salt, and to increase the percolation rate at the same time, the process according to the invention proposes to add a calcium compound (a calcuim salt such as calcuim hydroxide etc...) to the mixed salt. The molar ratio Fe/Ca will preferably range from 2/1 to 1/2. Higher calcium quantities give a powdery precipitate difficult to granulize efficiently, whereas smaller quantities do not noticeably improve the percolation rate.

The surplus of sulfide ions will preferably correspond to a molar ratio sulfide/iron ranging between 2 and 4. As a matter of fact any surplus of sulfide ions will give a sorption effect, but for effecting the described process in an industrial way, the sulfide concentration (S/Fe molar ratio) will preferably range from 2 to 4. Smaller concentrations of sulfide ions will give rise to mixed salts which are too quickly saturated; higher concentrations of sulfide ions in the mixed salt still improve the capacity of the sorbent, but are too difficult to prepare in an economical way.

According to a further aspect of this invention, a process for preparing a mixed salt for extracting heavy metal ions from water comprises mixing soluble compounds comprising the following ions: $Ba^{++}$, $S^{--}$, $Fe^{++}$, $Ca^{++}$, $SO_4^{--}$. Preferably the compounds are barium chloride, sodium sulfide, iron sulphate and calcium chloride.

In one form, the compounds are mixed in solution, allowed to precipitate and the precipitate is separated and dried. Preferably, the molar ratios of Fe/Ba, Fe/Ca and sulfide/iron are as given above.

It is evident that $BaCl_2$ can be replaced by any soluble barium salt, such as for instance barium nitrate. The anion of the barium salt should however remain in solution.

$Na_2S$ can also be replaced by any soluble sulfide. Even $H_2S$ can be used.

$BaCl_2$ and $Na_2S$ together could be replaced by BaS. But for economical reasons $BaCl_2$ and $Na_2S$ will be preferred.

$FeSO_4$ is added, because the iron cation as well as the sulphate anion are needed for the precipitate to be formed. It is evident that $FeSO_4$ can be replaced, on the one hand by any soluble sulphate, and on the other hand by a soluble bivalent iron salt. Finally, $CaCl_2$ may be replaced by any soluble calcium salt.

Embodiments of the invention will now be described by way of a number of examples and with reference to the accompanying drawings of which:

EXAMPLE 1

¼ 1 $BaCl_2$ 1 molar is added to 1 / $Na_2S$ 1 molar while continually stirring. Then, while still stirring, 1 / $FeSO_4$ 0.5 molar is added. Thus, a mixed salt precipitate is obtained in which $BaSO_4$ and FeS are quantitatively formed, in molar ratios Fe/Ba of 2/1 and Fe/S of 1/2. When the precipitate has completely deposited, it is filtered and dried at 150° during 4 hours. The excess of sulfide ions in the dried substance is not known because it largely depends on the drying process; the drying temperature, as well as the humidity degree in the oven, the layer thickness and other factors influence the sulfide content. The addition of Ca ions during the preparation gives a precipitate in which the surplus of sulfide ions can be considerably increased.

EXAMPLE 2

Figure 1:
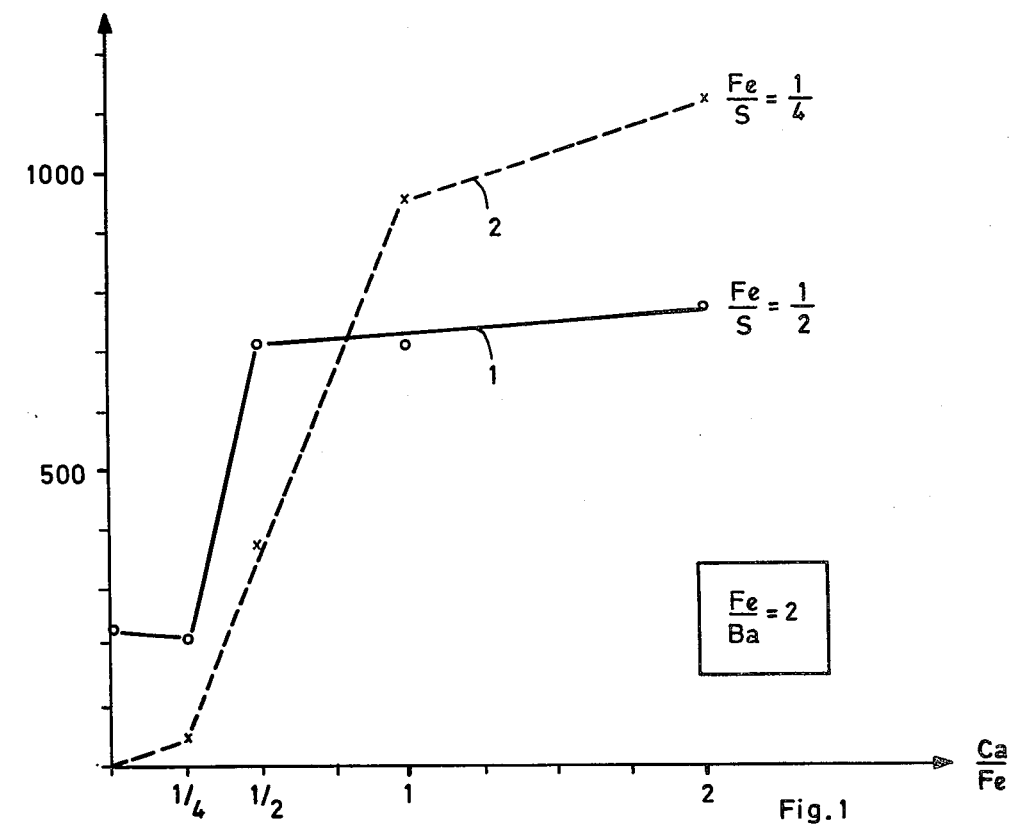
FIG. 1 is a graph of column volumes per hour against the Ca/Fe molar ratio in the sorbent.

Example 1 is repeated, but $CaCl_2$ is co-precipitated in different ratios. The influence of the presence of Ca in the mixed salt on the flow of the stabilized FeS is represented on the diagram shown on FIG. 1, in which the ordinate represents the flow (number of column volumes per hour) and the abscissa the molar ratio Ca/Fe in the sorbent. Curve 1 shows clearly that for a molar ratio Ca/Fe of less than ¼, the flow does not noticeably change. From ratios Ca/Fe of ½ onwards, the flow is considerably increased from 230 column volumes per hour to more than 700 column volumes per hour. FIG. 1 also shows a curve 2, in which the mixed salt is prepared in the same way as in Example 1, but in which the molar ratio Fe/S is ¼ during the precipitation. During the preparation of this mixed salt, Ca is also added in different quantities. Curve 2 also shows clearly that the percolation rate of the mixed salt FeS/$BaSO_4$ without Ca is almost unexisting. An addition of Ca in a ratio Ca/Fe smaller than ¼, slightly increases the percolation rate. When this molar ratio increases, the percolation rate increases noticeably to arrive at a value of 960 column volumes per hour with a molar ratio Ca/Fe = 1.

EXAMPLE 3

To the mixed salt obtained according to Example 1, Ca is added in a molar ratio Ca/Fe of respectively ½, 1 and 2.

Figure 2:
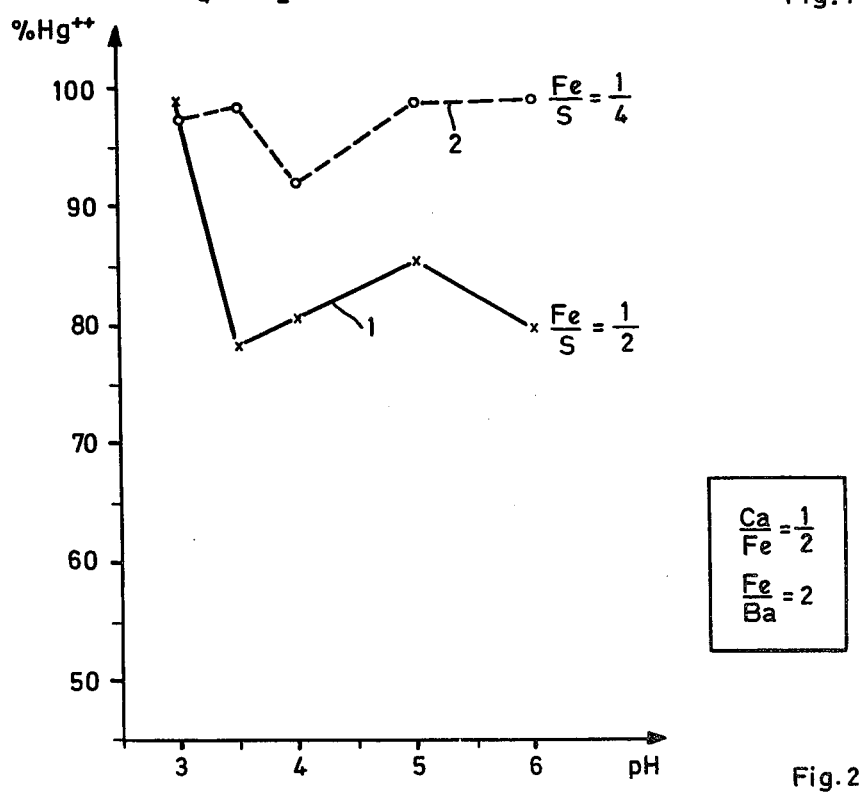
FIGS. 2 to 4 show graphs of % $Hg^{++}$ ions sorption against the pH of liquid to be treated for a variety of molar ratios.
Figure 3:
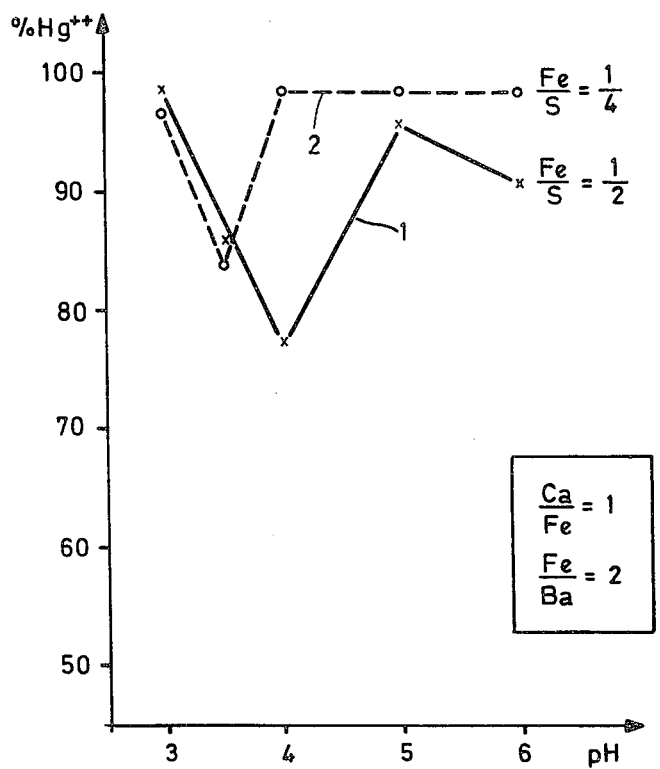
Figure 4:
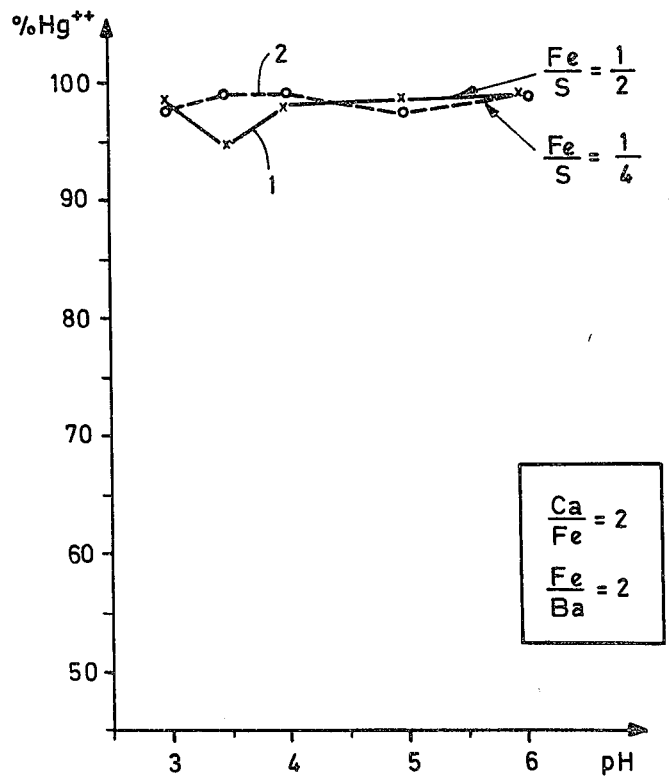

The sorption of $Hg^{++}$ ions on these salts is tested by means of a test water consisting of demineralized water to which were added 1,000 ppm $Na^+$, 40 ppm $Ca^{++}$, and 1 ppm $Hg^{++}$. Curve 1 of FIGS. 2, 3 and 4, represents the % $Hg^{++}$ sorption (ordinate) in function of the pH (abscissa) of the test water, which is modified by addition of sulfuric acid.

The same tests were repeated with a mixed salt with a molar ratio Fe/S (on precipitation) of ¼. The % $Hg^{++}$ ions sorbed in function of the pH is shown by curve 2 on FIGS. 2, 3 and 4.

These tests clearly show the effect of a surplus of sulfide ions and the influence of calcium in the sorbent. As can be deduced from FIG. 4, the sorbent is practically not influenced by the pH of the water if the Ca/Fe ratio reaches the value 2.

It clearly appears from these examples that optimal results are reached with a mixed salt having a molar ratio Fe/S near to ¼, and to which Ca is added in a molar ratio Ca/Fe ranging from 1 to 2. These tests were made with a molar ratio Fe/Ba of 2. Similar tests with Fe/Ba = 2.5 gave about the same results.

EXAMPLE 4

While stirring, 101 $CaCl_2$ 1 molar is added to 4 1 $Na_2S$ 1 molar. Still stirring one adds to the formed precipitate ½ 1 $BaCl_2$ 1 molar, and afterwards 2 1 $FeSO_4$ ½ molar. The mixture is still stirred during 5 minutes and then allowed to precipitate before being filtered and dried for 12 hours at 150°. The formed precipitate is then ground into grains varying from 0.27 to 1.17 mm and placed in a column of 1.85 cm diameter and filled up to 15 cm height. A test water is poured through three of these columns, at a flow of 50 column volumes per hour. The test waters, all having a pH = 6, were respectively composed as follows:

1. demineralized water, to which 2,000 ppm $Na^+$, 40 ppm $Ca^{++}$, and 0.1 ppm $Hg^{++}$ were added;
2. demineralized water, to which 2,000 ppm $Na^+$, 40 ppm $Ca^{++}$, and 0.5 ppm $Hg^{++}$ were added;
3. demineralized water, to which 2,000 ppm $Na^+$, 40 ppm $Ca^{++}$, and 2 ppm $Hg^{++}$ were added.

Figure 5:
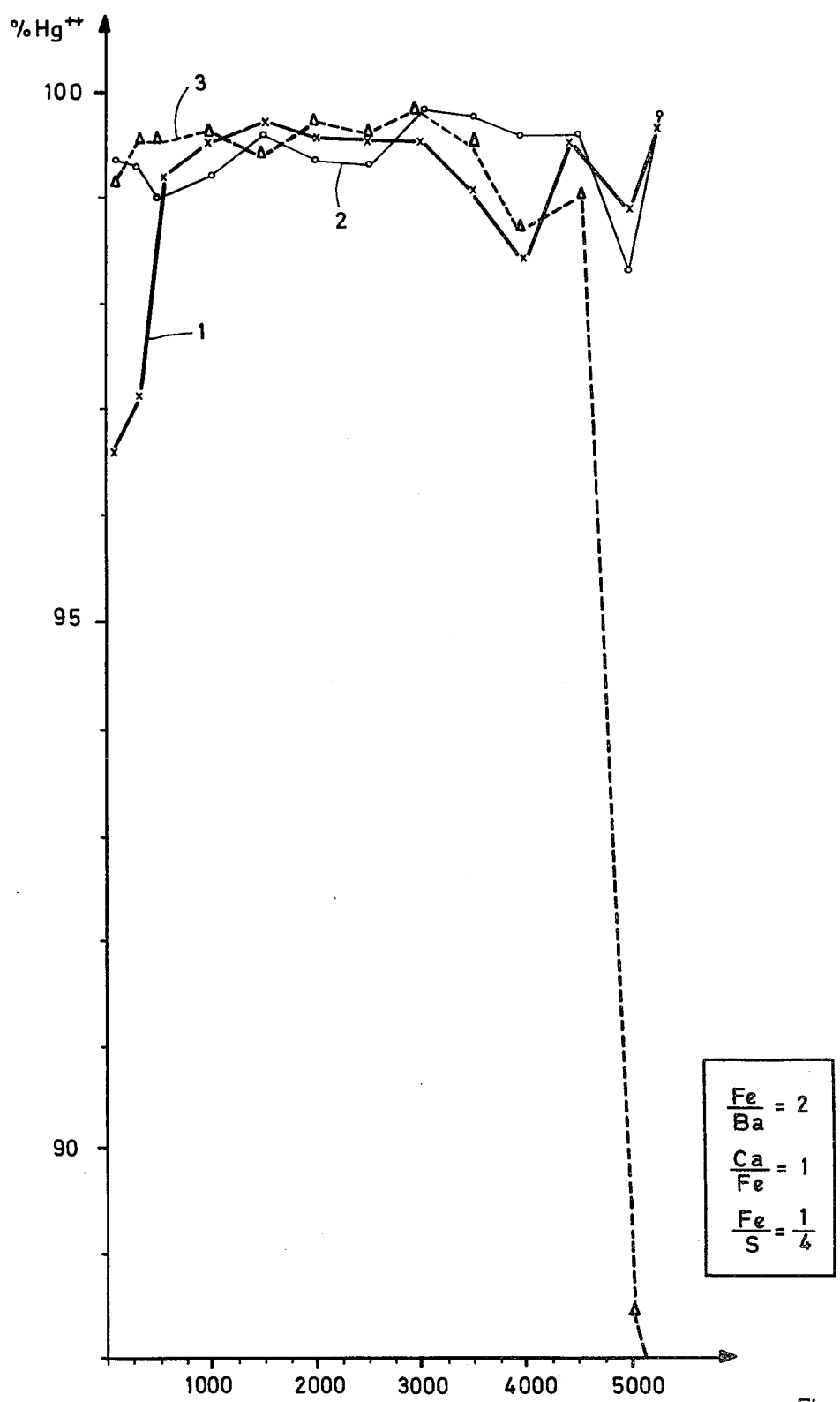
FIG. 5 shows a graph of % $Hg^{++}$ ions sorption against the column volumes per hour for a variety of liquids to be treated.

The % $Hg^{++}$ sorption is shown on the diagram of FIG. 5, by curves 1, 2 and 3 respectively. This diagram, showing the $Hg^{++}$ sorption on its ordinate and the number of column volumes on its abscissa, clearly shows that for these three test waters mercury ions are sorbed for more than 99 % up to 4500 column volumes.

For the two first test liquids the sorption still continued; for the third liquid, the stabilized iron sulfide was saturated.

It is evident that the invention is not limited to the embodiments described and that numerous modifications are possible within the scope of this invention.

We claim:

1. Process for extracting small quantities of heavy metal ions selected from the group consisting of mercury, copper, lead, zinc, and cadmium from water, wherein the water is brought into contact with an insoluble mixed salt of iron sulfide and barium sulphate, containing a surplus of sulfide ions, wherein the molar ration of iron/barium is between 1 and 3.

2. Process according to claim 1, wherein the mixed salt also comprises a calcium salt.

3. Process according to claim 2, wherein the molar ratio iron/calcium is between 2 and 0.5.

4. Process according to claim 3, wherein the molar ratio of sulfide/iron is between 4:1 and 2.

5. Process according to claim 4, wherein the molar ratio of iron/barium is between 2 and 2.5.

6. Process according to claim 2, wherein the calcium salt is calcium hydroxide.

7. Process according to claim 6 wherein the molar ratio of iron/calcium is between 2 and 0.5 and the molar ratio of sulfide/iron is between 4:1 and 2:1.

8. Process according to claim 7 wherein the molal ratio of iron/barium is between 2 and 2.5.

9. Process according to claim 1, wherein the molar ratio of iron/barium is between 2 and 2.5.

10. Process according to claim 1, wherein the molar ratio sulfide/iron is between 4:1 and 2:1.

* * * * *

UNITED STATES PATENT OFFICE
CERTIFICATE OF CORRECTION

Patent No. 3,901,802     Dated August 26, 1975

Inventor(s)   Karel Peeters, et al

It is certified that error appears in the above-identified patent and that said Letters Patent are hereby corrected as shown below:

On the title sheet, for the assignee, read --Belgonuclaire and Centre d'Etude de L'Energie Nucleaire, both of Brussels, Belgium.

Column 3, line 6, for "1 /" read --1 1-- ;
   line 7, for "1 /" read --1 1--.

Column 4, line 8, for "101" read --1 1--;
   line 60, for "molal" read --molar--.

Signed and Sealed this thirtieth Day of March 1976

[SEAL]

Attest:

RUTH C. MASON
Attesting Officer

C. MARSHALL DANN
Commissioner of Patents and Trademarks